United States Patent [19]

Benjamin

[11] 4,331,503
[45] May 25, 1982

[54] MANUFACTURE OF SOLAR COLLECTOR PANELS

[76] Inventor: Charles M. Benjamin, 1522 Kirkwood Blvd., Davenport, Iowa 52803

[21] Appl. No.: 64,216

[22] Filed: Aug. 6, 1979

[51] Int. Cl.³ .................... B29C 17/08; F24J 3/02
[52] U.S. Cl. .................... 156/633; 126/448; 126/449; 126/901; 156/654; 156/668; 156/292
[58] Field of Search .................... 126/448, 449, 901; 156/633, 668, 654, 292; 264/293; 118/316; 427/275, 270

[56] References Cited

U.S. PATENT DOCUMENTS

| | | | |
|---|---|---|---|
| 3,076,450 | 2/1963 | Gough et al. | 126/444 |
| 3,192,063 | 6/1965 | Donofrio | 427/270 |
| 3,209,686 | 10/1965 | Arthurs | 264/293 |
| 3,254,703 | 6/1966 | Thomason | 165/48 |
| 3,866,285 | 2/1975 | Clark | 29/157 R |
| 3,986,491 | 10/1976 | O'Hanlon | 237/1 A |
| 4,023,556 | 5/1977 | Sarazin et al. | 237/1 A |
| 4,026,268 | 5/1977 | Bartos et al. | 237/1 A |
| 4,058,109 | 11/1977 | Gramm | 165/40 |
| 4,062,351 | 12/1977 | Hastwell | 126/437 |
| 4,086,912 | 5/1978 | Freeman | 237/1 A |
| 4,122,828 | 10/1978 | DiPeri | 165/170 |
| 4,126,014 | 11/1978 | Kay | 62/2 |
| 4,128,095 | 12/1978 | Oren et al. | 126/437 |
| 4,132,217 | 1/1979 | Rom et al. | 126/437 |
| 4,154,220 | 5/1979 | Loth | 126/439 |
| 4,193,373 | 3/1980 | Hanson et al. | 118/316 |
| 4,243,022 | 1/1981 | Pedone | 126/449 |

Primary Examiner—Jerome W. Massie
Attorney, Agent, or Firm—Howson and Howson

[57] ABSTRACT

A method of making a solar collector panel comprises the steps of applying a quantity of solvent to one face of a synthetic foam sheet to form a pattern of solvent stripes on said face, allowing the applied solvent to etch a pattern of grooves having highly irregular surfaces, painting the surfaces of the grooves exposed by the action of the solvent with light-absorbing coloring matter, and securing a light-transmitting cover sheet to the remaining portions of said face. The cover sheet, when secured, conforms to the shape of the face prior to the solvent application step, whereby the grooves and the cover sheet together form channels for the flow of a heat transfer fluid such as water or air.

6 Claims, 16 Drawing Figures

MANUFACTURE OF SOLAR COLLECTOR PANELS

BRIEF SUMMARY OF THE INVENTION

This invention relates to the art of solar heating and particularly to a novel solar collector panel and a novel method of making solar collector panels.

Although numerous types of solar collector panels have been proposed for use in heating buildings and for heating domestic water supplies and swimming pools, solar heating is still regarded in many quarters as impractical from an economic standpoint because of the large capital expenditures required. Effective solar collector systems currently available on the market are well out of the financial reach of most homeowners despite the availability of loans and tax credits.

The principal object of this invention is to provide an efficient solar collector which is far less expensive to manufacture and install than are the solar collectors currently available on the market.

A solar collector panel is made in accordance with the invention by first providing a solidified sheet of foam material, applying a quantity of solvent to one face of the foam sheet to form a pattern of solvent stripes on said face, allowing the applied solvent to etch a pattern of grooves in said face corresponding to the pattern of stripes, causing the interior surface of the grooves exposed by the action of the solvent to have a light-absorbing color, and securing a light-transmitting cover sheet to the remaining portions of the face, said cover sheet, when secured, conforming in shape substantially to the shape of the face prior to the solvent application step, so that the grooves and the cover sheet act together to form channels for the flow of a heat transfer fluid such as air or water.

The application of a solvent to the face of a foam sheet produces grooves having an irregular exposed surface with a large surface area for greatly improved transfer of heat from the surface of the grooves to the heat transfer fluid. In the case in which air or another gas is used as a heat transfer fluid, the irregular surfaces of the grooves also produces turbulence, resulting in improved efficiency in the transfer of heat. The irregularity of the surfaces of the grooves also improves the absorption of sunlight.

Molded, expanded bead foam sheets are especially suited for this process, since solvents applied to them form grooves having highly irregular surfaces.

The action of the solvent on the foam also produces a strong impervious layer at the exposed surfaces of the grooves. This impervious layer resists penetration by water, thus making the foam sheet practical as a solar absorber in a water-type solar heating system.

Panels made in accordance with the invention can be readily assembled into a modular system of any desired size. It is therefore also an object of the invention to provide a modular solar collection system which is easily installed and adapted for assembly and installation by persons lacking extensive training in the assembly of solar systems.

Still another object of the invention is to provide an inexpensive solar collector which is nevertheless durable and capable of effective operation over extended periods of time.

Other objects of the invention will be apparent from the following detailed description when read in conjunction with the drawings.

DETAILED DESCRIPTION

The principal steps of the process of making a solar collector panel are the application of solvent, the etching of grooves, the application of coloring material, and the attachment of the light-transmitting cover sheet. These steps are illustrated in FIGS. 1 through 6, and can be carried out in succession in a continuous process. In the continuous process, individual sheets of foam are moved by rollers or other suitable conveyor means through an apparatus comprising stationary means for applying solvent and coloring material and for applying the light-transmitting sheet.

Figure 1:
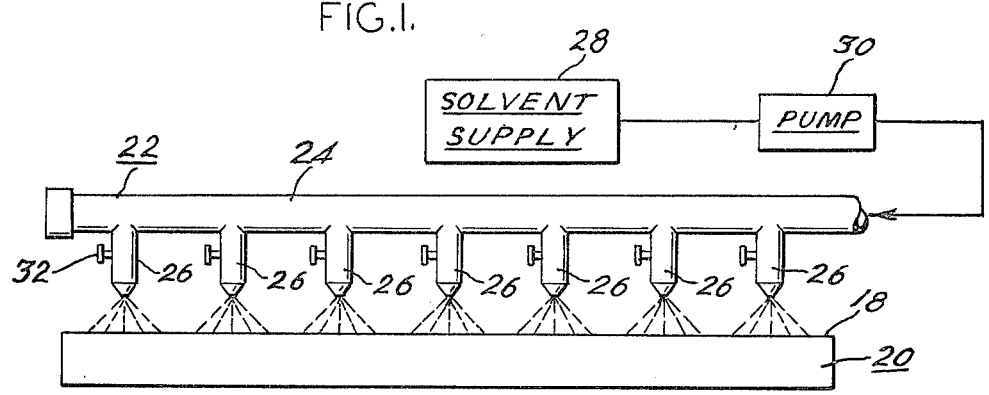
FIG. 1 is a partially diagrammatic elevational view illustrating the step of applying solvent to the face of a foam sheet.

In FIG. 1, solvent is shown being sprayed onto a face 18 of a sheet 20 of synthetic resin foam. The solvent applicator 22 comprises a conduit 24 having a plurality of nozzles 26 spaced along the conduit and arranged to apply solvent in a fine spray to face 18 of the foam sheet to form a pattern of parallel solvent stripes on the sheet as it moves past the solvent applicator. Solvent is supplied to conduit 24 from a supply 28 by a pump 30.

Desirably, the nozzles are individually adjustable by manual adjusting means such as adjusting means 32 on the left-hand nozzle. In this way, the rate at which solvent is applied in each stripe can be accurately controlled in order to regulate the depths of the grooves formed by the action of the solvent.

To prevent solvent from running laterally immediately after its application, heated rollers (not shown) may be used to form shallow, flat-bottomed indentations in the foam to receive the sprayed solvent.

Foam sheet 20 moves perpendicular to solvent conduit 24, and therefore, the solvent applicator produces parallel solvent stripes on face 18 of the foam sheet. The solvent nozzles are arranged to insure that the stripes are spaced from each other so that distinct stripes are formed, and so that between each adjacent pair of stripes, and at the edges of the foam sheet, narrow, elongated rectangular areas are provided to which solvent is not applied. FIG. 1 illustrates one convenient method of applying solvent. Solvent can, of course, be applied by various methods other than spraying such as by the use of rollers or by various silk screen processes. Furthermore, the solvent stripes can be provided in various patterns other than parallel rectangular stripes.

Figure 2:
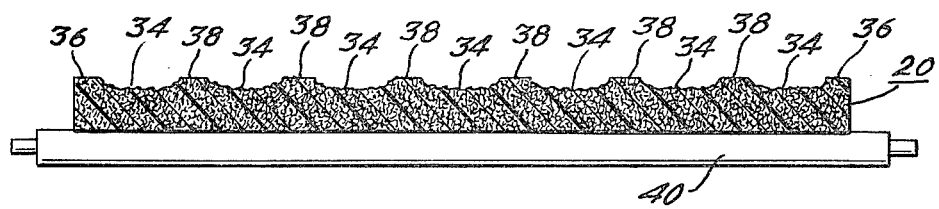
FIG. 2 is a transverse section of a foam sheet illustrating the etching action of the solvent.
Figure 3:
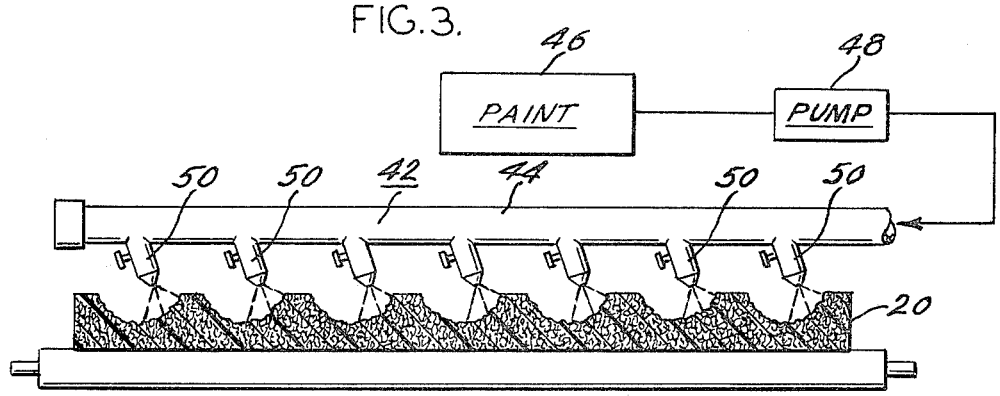
FIGS. 3 and 4 are elevational views, partly in transverse section, illustrating the manner in which light-absorbing coloring matter is applied to the solvent-produced grooves.
Figure 4:
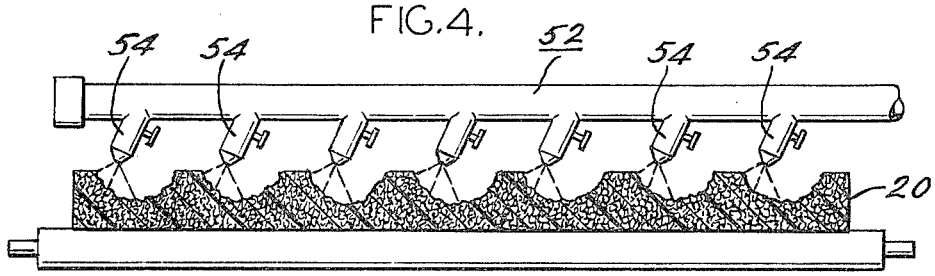

As soon as foam sheet 20 passes the spray nozzles of FIG. 1, grooves begin to form in face 18 of the foam sheet by reason of the action of the solvent. Partially formed grooves 34 are illustrated in FIG. 2. Unetched areas 36 are indicated at the opposite edges of the sheet, and unetched areas 38 separating the adjacent grooves are also shown. The foam sheet is carried by a driven conveyor roller 40. Where conveyor rollers are used, it is important not to position them underneath the solvent applicator, since a spacing between adjacent foam sheets in the production line would result in the application of solvent to the roller and the consequent etching of the underside of the sheet.

In the preferred embodiment of the invention, the foam sheet is polystyrene, and the solvent is a volatile solvent such as a mixture of acetone, ethyl acetate and toluene. The solvent is allowed to act on the foam sheet until the grooves are fully formed. Accordingly, a sufficient distance is provided between the solvent applicator and the coloring matter applicator in the production line to allow complete action of the solvent and evaporation of any excess solvent. In some instances, it is desirable to provide a dryer (not shown) to insure evaporation of any excess solvent from the grooves before coloring matter is applied. If the solvent is a nonvolatile type such as an alkali, which would typically be used to etch grooves in a polyurethane sheet, excess solvent may be removed by a water washing step followed by a drying step.

The action of the solvent on the foam sheet produces grooves having a rough and irregular interior surface. The application of coloring material to this rough and irregular surface is carried out by the use of several coloring material spray applicators arranged in succession along the production line. A first applicator 42, shown in FIG. 3 comprises a conduit 44 which is supplied with coloring material from a supply 46 by a pump 48. Applicator 42 comprises a series of nozzles 50, which are similar to the nozzles of the solvent applicator, except that they are disposed at oblique angles. The second stage applicator 52, shown in FIG. 4 has a series of nozzles 54 extending obliquely in the opposite direction.

Figure 5:
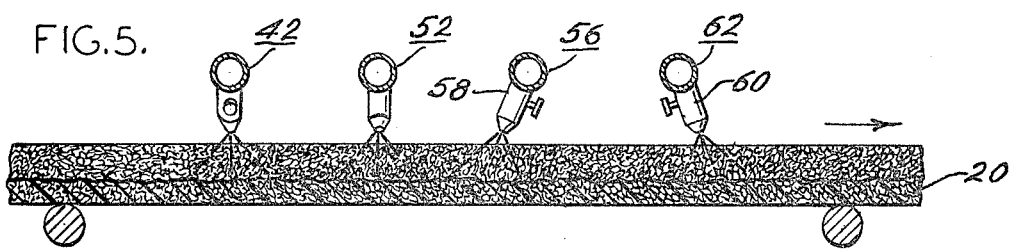
FIG. 5 is a longitudinal section further illustrating the application of light-absorbing coloring matter.

Altogether, four successive coloring matter applicators are provided, as shown in FIG. 5, which is a longitudinal section. The second applicator 52 is followed by a third applicator 56, the nozzles 58 of which are oblique and rearwardly disposed. The nozzles 60 of a final applicator 62 are oblique and forwardly disposed. Thus, coloring matter is applied to each groove from four different directions to prevent masking and to insure substantially complete coverage of the irregular interior groove surface exposed by the solvent action. As an alternative means of applying coloring matter, conventional electrostatic spraying equipment can be used. As further alternatives the coloring matter can be introduced in the process of forming the foam sheet or applied along with the solvent.

Figure 6:
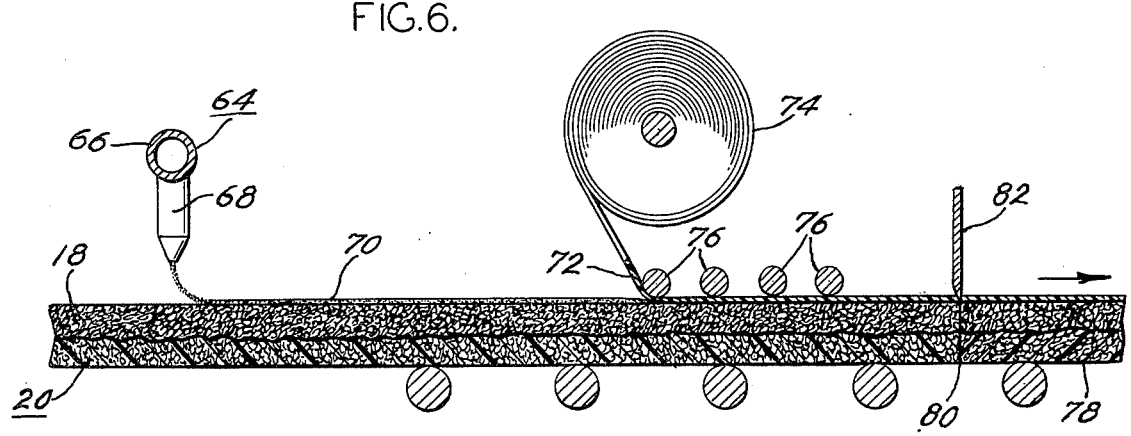
FIG. 6 is a longitudinal section illustrating the manner in which the cover sheet is secured to the grooved face of a foam sheet.

Following the application of coloring matter, the foam sheet is preferably passed through a dryer (not shown) to accelerate drying of the coloring matter. Then, as illustrated in FIG. 6, strips of liquid adhesive are applied to the remaining portions of the original face 18 of the foam sheet by an applicator 64, which comprises a conduit 66 having a series of adhesive applicators 68 disposed side-by-side, and positioned just above the rectangular areas at the edges and between the grooves of foam sheet 20. These applicators apply adhesive stripes, such as stripe 70. Following the application of adhesive stripes, a light-transmitting sheet 72, supplied from a supply roll 74 is fed underneath rollers 76, and pressed downwardly against the face of foam sheet 20. This light-transmitting cover sheet is secured to the face of the foam sheet by the adhesive, and substantially conforms in shape to the shape of the face prior to the solvent application step. That is, if the original face was flat, the light-transmitting sheet will normally be flat in the final product.

Occasionally, it is desirable to provide two or more spaced transparent sheets. An additional transparent sheet can be readily installed by adhesively securing solid foam spacer strips to the outside surface of the first transparent sheet just above the ridges of the foam sheet, and thereafter adhesively securing the additional transparent sheet to the spacer strips. Conventional double-sided foam tape can be used for this purpose.

The interface between a foam sheet 20 and a previously processed foam sheet 78 is indicated in FIG. 6 at 80. A knife or shear, shown schematically at 82, is used to cut the light-transmitting sheet at the location of interface 80 so that individual solar collector panels are produced, each comprising a grooved foam sheet having a light-transmitting cover sheet substantially conforming to the shape of the original face of the foam sheet.

Figure 8:
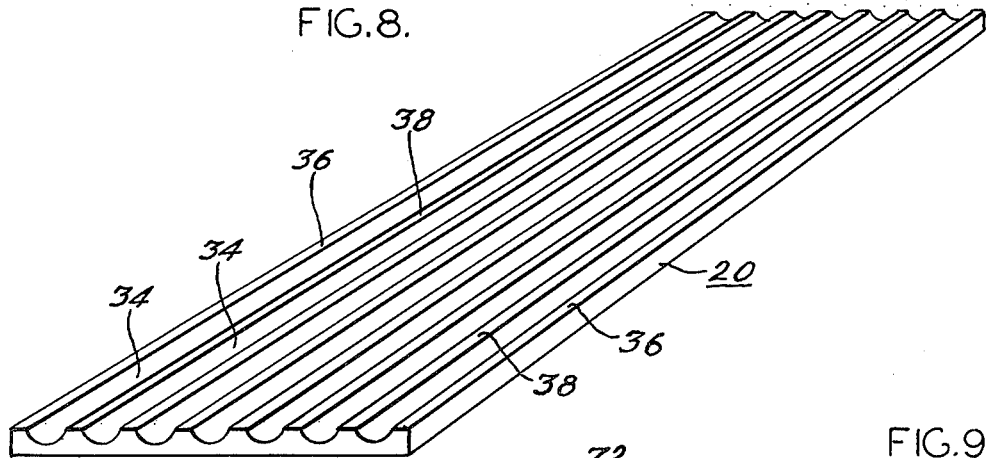
FIG. 8 is an oblique perspective view of a grooved panel prior to the application of the light-transmitting cover sheet.

The configuration of grooves in a typical foam sheet 20 is illustrated in FIG. 8. A typical foam sheet is two inches thick, eight feet long, and approximately twenty-three inches wide for a nominal two-foot wide collector. The grooves 34 are three inches wide at the face of the sheet, and one inch in average depth. Sections 36 and 38 of the original face of the sheet are preferably between one-eighth and three quarters of an inch in width.

Figure 7:
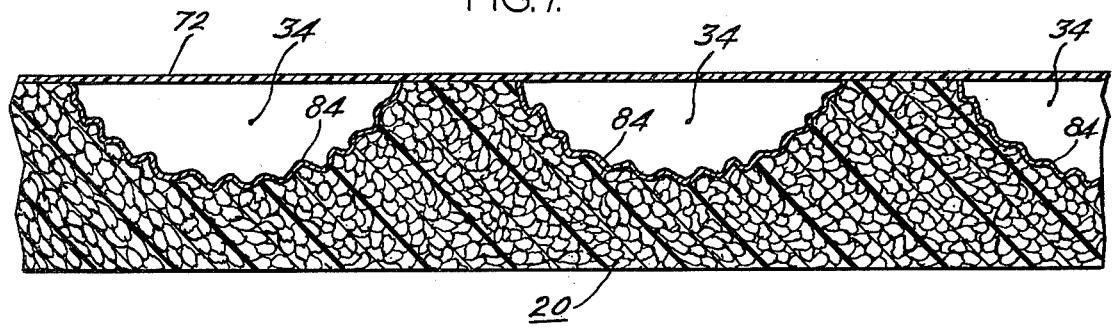
FIG. 7 is a transverse section of a completed solar collector panel in accordance with the invention.
Figure 9:
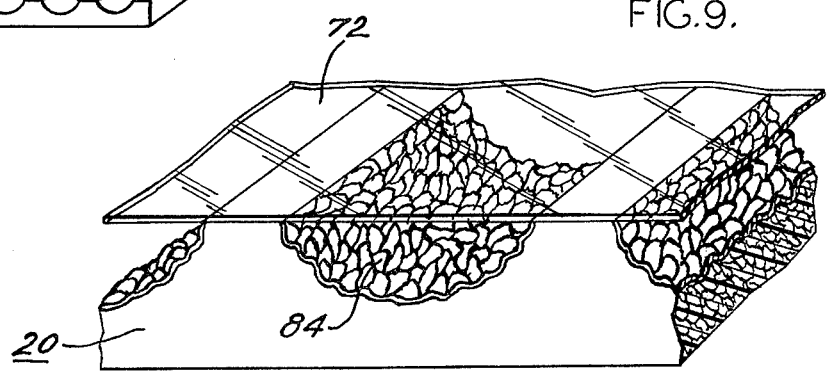
FIG. 9 is a fragmentary perspective view of the grooved foam sheet with the light-transmitting cover sheet applied.

FIGS. 7 and 9 illustrate the configuration of the completed solar collector panel. The foam sheet 20, having grooves at 34, together with light-transmitting sheet 72, provides a solar collector having parallel closed channels adapted for the flow of air, water or other heat-transfer fluid from one end of the panel to the opposite end. The light-absorbing coating 84 covers substantially the entire irregular surface of each groove.

In the operation of the panel, sunlight passes through light-transmitting sheet 72, and strikes the light-absorbing coating 84. Coating 84 is heated, and a portion of the heat energy in the coating is transferred to the heat transfer fluid passing through the channels. The large surface area resulting from the irregularity of the surfaces of the grooves, contributes substantially to the efficiency of the transfer of heat to the fluid, whether the fluid is air or water. The irregularity of the surface of the grooves also contributes to efficiency by providing pockets which absorb light rays striking the surface more efficiently. In the case in which air is used as the heat transfer fluid, the irregular surface also produces turbulent flow in the channels, which contributes to the efficiency of heat transfer.

The light-absorbing surfaces are characterized by irregularly shaped open pockets which are formed by the action of the solvent. These pockets are larger, usually by several orders of magnitude, than the cells of the foam, and produce highly efficient heat transfer to the heat transfer fluid. While the action of solvent on practically any solidified foam will produce these pockets, expanded bead foams are especially desirable because the action of the solvent tends to cause the beads to collapse, thereby forming especially deep pockets and a very irregular surface.

Figure 10:
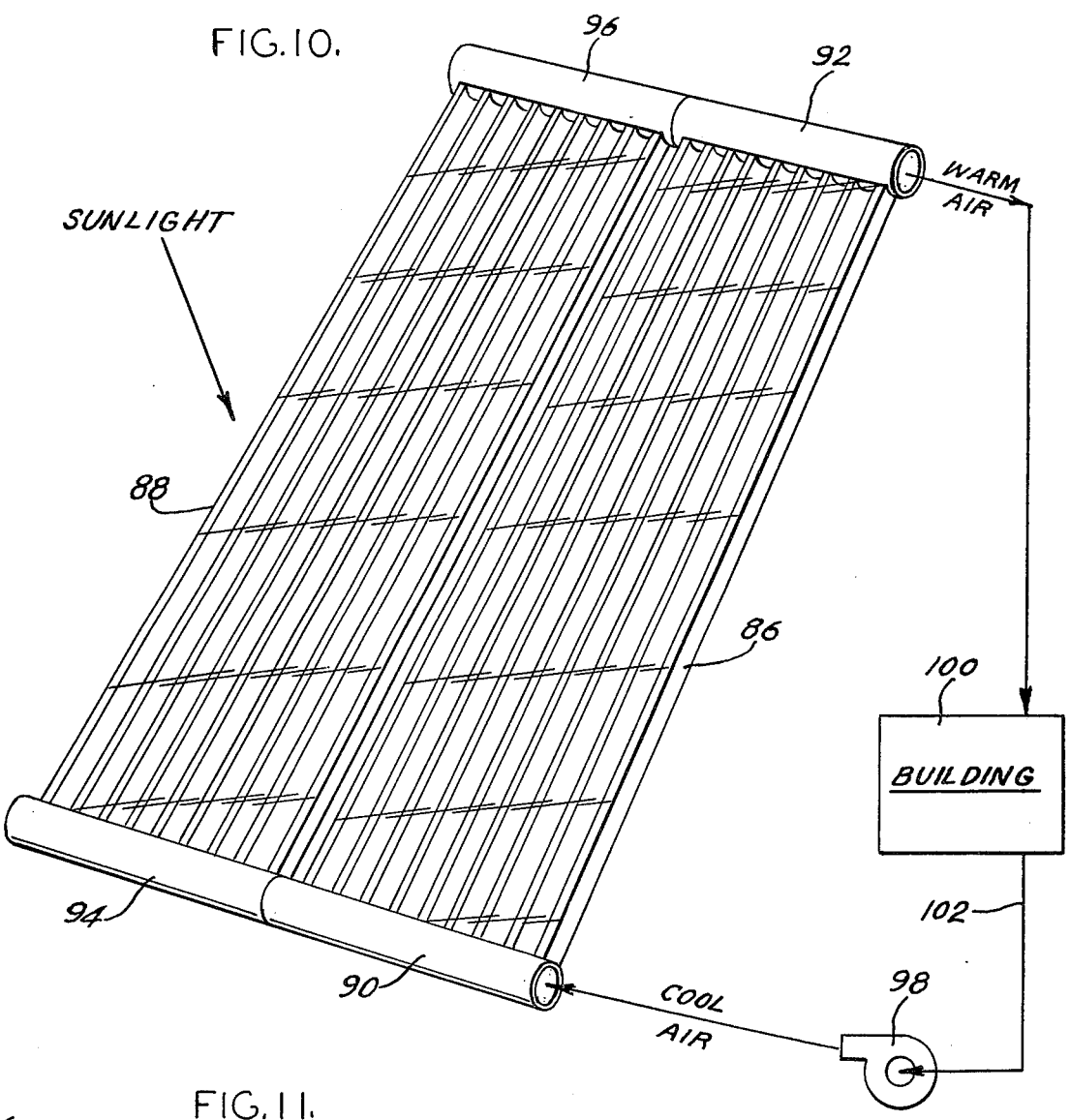
FIG. 10 is a schematic diagram of an air-type solar heating system using solar collector panels made in accordance with the invention.

FIG. 10 illustrates a simplified heating system in which air is used as the heat transfer fluid. Two panels, 86 and 88 are provided in side-by-side relation. Panel 86 has a lower header 90 and a upper header 92, and panel 88 has similar headers 94 and 96. Header 90 is connected in communication with header 94 and header 92 is similarly connected in communication with header 96. Any number of panels can be connected in this manner depending upon the available area and the desired capacity of the system. The left-hand ends of headers 96 and 94 are closed by suitable caps (not shown). Air is delivered to headers 90 and 94 by a blower 98. The panels are preferably arranged with the grooves sloping upwardly from the lower header assembly to the upper header assembly to take advantage of convection. Warm air from the assembly of headers 92 and 96 is delivered to building 100, or the portion thereof which is to be heated, or to storage. Air from the building can be returned to blower 98 through path 102.

The panels are extremely simple in construction, since the only elements required are the foam sheet, the light-absorbing coating, the light-transmitting sheet, and the adhesive which secures the light-transmitting sheet to the foam sheet. The foam sheet serves as an insulating backing, and at the same time provides the channels for the flow of heat-transfer fluid. The irregular groove surface, produced by solvent etching, produces the highly efficient transfer of heat which makes this form of solar collector panel especially desirable for the heating of buildings and for domestic water heating.

Figure 11:
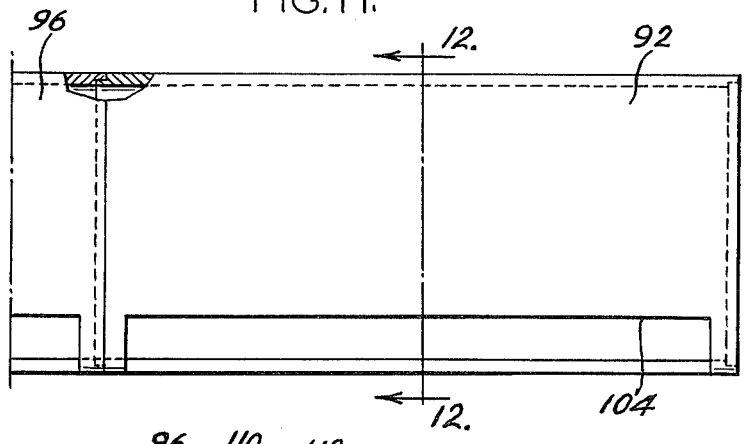
FIG. 11 is an elevational view, partly in section of an air header for attachment to the ends of the panels.
Figure 12:
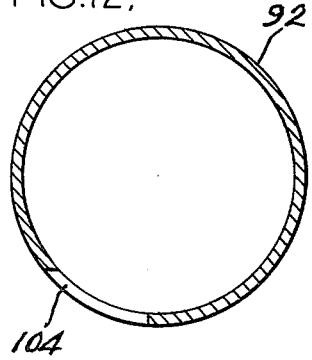
FIG. 12 is a sectional view of the air header taken on the plane 12—12 of FIG. 11.
Figure 13:
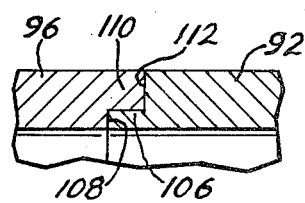
FIG. 13 is a fragmentary longitudinal section illustrating the manner in which two air header sections are attached end-to-end.

The individual header modules, as illustrated in FIGS. 11, 12 and 13, are tubular foam polystyrene or any other appropriate material. Header 92 is twenty-four inches in length, and has a twenty-three inch slot 104 adapted to receive the upper end of panel 86 to provide substantially air-tight communication between the channels of the panel and the interior of header unit 92. Each of the other headers is similarly slotted. The ends of the headers interlock with each other in the manner illustrated in FIG. 13, header 92 being provided with an annular projection 106 which is received by a recessed groove 108 of unit 96, and unit 96 being provided with a projection 110, which is received in a recessed groove 112 of header unit 92.

The collector panels are preferably assembled in the following manner. The panels are arranged side-by-side on a suitable supporting surface such as the sloping roof of a building. The header units are then installed at the opposite ends of the panels, and interlocked with each other to produce an assembly such as that shown in FIG. 10. The ends of the panels are then joined in the slots of the header units by applying a suitable adhesive along the edges of the slots such as slot 104. The header units are then joined together to complete the assembly. It is not absolutely necessary to apply adhesive along all of the edges of the header unit slots. However, if it is desired to do so, adhesive can be applied to secure the light-transmitting sheet of each panel to the upper edges of the slots of the header units for that panel. As soon as the adhesive hardens sufficiently to insure against slippage, the entire panel can be turned over to allow adhesive to be applied to the opposite edges of the header slots. In this way, proper mating of the header units of adjacent panel assemblies can be insured.

Figure 14:
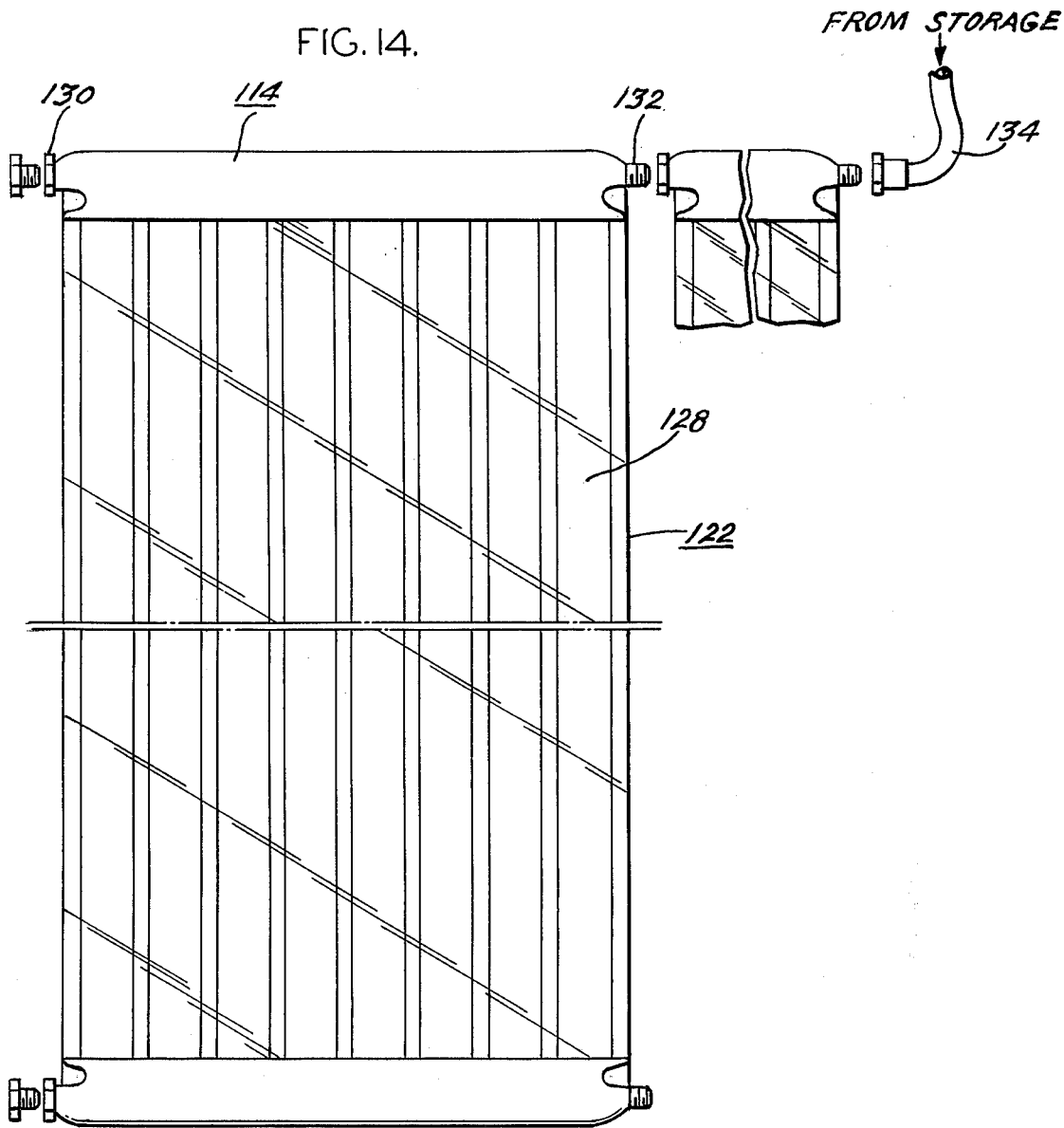
FIG. 14 is a fragmentary top plan view of a solar panel array in accordance with the invention provided with water headers.
Figure 15:
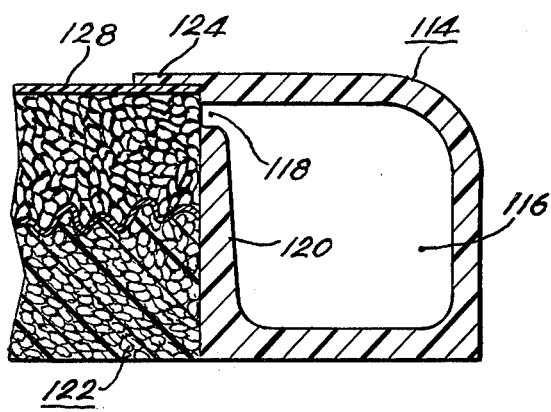
FIG. 15 is a fragmentary sectional view illustrating the operation of a top water header.
Figure 16:
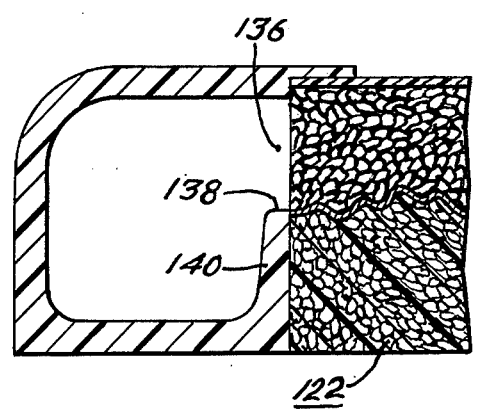
FIG. 16 is a fragmentary section illustrating the operation of a top or bottom water header.

The same basic solar panel as described above can be used with water or another liquid as a heat transfer medium by using the modified header assembly illustrated in FIGS. 14, 15 and 16. In this case, the upper header 114 can be a blow-molded tubular hollow member of polyvinyl chloride or other suitable material with an interior channel 116, having a series of openings such as opening 118 (FIG. 15). Each opening corresponds to, and is alignable with, one of the flow channels of the panel. These openings are located at the upper end of a wall 120 of the header. Wall 120, as shown in FIG. 15, is secured to the upper end of panel 122 by cementing. A projection 124 from the top of the header unit extends over the light-transmitting sheet 128. The opposite ends of header 114 are provided with fittings 130 and 132 for interconnection with adjacent headers, or for interconnection with flexible tubes such as tube 134, which tubes are used to carry water to and from the collector assembly. The bottom header, as shown in FIG. 16 is similar, except that, instead of individual openings such as opening 118, it has an elongated opening 136 which is adapted to receive water from all of the channels in panel 122. The upper edge 138 of wall 140 preferably extends no higher than the bottoms of the etched grooves of the collector panel. In the operation of the system of FIGS. 14, 15 and 16, water is introduced at the top of the panel through header 114, and is carried away by the bottom header to a heat exchanger and returned to header 114 by a pump. As in the case of the air system of FIG. 10, any number of panels can be connected together in side-by-side relationship to produce a system of any desired size.

The system using water can be of the trickling type, as shown, or it can be of the upward flow type. In the case of an upward flow system the headers at the upper ends of the panels are of the kind shown in FIG. 16, while the headers at the lower ends of the panels can be either the kind shown in FIG. 15 or the kind shown in FIG. 16.

The foam sheet used in making the solar collector panel can be made from various foamable materials including such materials as polystyrene, cellulose acetate, cellulose acetate propionate, acrylonitrile-butadiene-styrene (ABS), polyvinyl chloride (PVC), polyurethane, phenol-formaldehyde reaction product (phenolic), acetal polymers, acrylics, polyamid (Nylon), thermoset polyesters, polyethylene, polypropylene, silicones, styrene-acrylonitrile, urea-formaldehyde, and rubber.

The light-transmitting sheet can likewise consist of any one of a number of available materials including the polytetrafluoroethylene film known by the trademark TEDLAR, polycarbonate sheets, such as the sheet known by the trademark MERLON, and polyester sheets such as those known by the trademark MYLAR. In addition, glass can be used as the transparent sheet.

Polystyrene is a preferred foam material because it can be etched readily by a wide variety of inexpensive and commonly available solvents. Suitable solvents for polystyrene include practically all available aromatic and chlorinated hydrocarbons, solvents, ketones and esters. Conventional lacquer thinners make excellent solvents for use in etching grooves in foam polystyrene. For example, a lacquer thinner consisting of equal parts by weight of acetone, ethyl acetate, and toluene is suitable for use with polystyrene. Other solvents suitable for use in etching polystyrene include: aromatic hydrocarbons such as benzene and xylene; esters such as n-proply acetate, isopropyl acetate, n-butyl acetate, sec-butyl acetate, methyl-amyl acetate and ethylene glycol monoethyl ether acetate; ketones such as methyl-ethyl ketone and isophorone; various chlorinated hydrocarbons such as chloroform and chlorobenzene; heptane; and gasoline.

Suitable solvents for cellulose acetate and cellulose acetate propionate foams include ketones such as acetone, methyl-ethyl ketone and isophorone, esters such as ethyl acetate and ethylene glycol monoethyl ether acetate, amines such as aniline, and chlorinated hydrocarbons such as chloroform and chlorobenzene.

Solvents suitable for etching ABS foams include benzene, ketones such as acetone and methyl-ethyl ketone, esters such as ethyl acetate, and some chlorinated hydrocarbons such as carbon tetrachloride, chloroform and chlorobenzene.

PVC foams can be etched by the application of cyclohexane, methyl-ethyl ketone, hot sulfuric acid or hot sodium hydroxide.

Polyurethane can be etched by sodium hydroxide, and by various aromatic hydrocarbons such as benzene, toluene and xylene, and chlorinated hydrocarbons such as chlorobenzenes and chloroethylenes, carbon tetrachloride and chloroform. Methylene chloride and methyl chloride are also suitable for etching polyurethane.

Phenolic foams can be etched by acetone, hydrochloric acid, nitric acid, sulfuric acid and sodium hydroxide.

Acetal foams can be etched by hydrochloric acid, nitric acid, and sulfuric acid.

Example of suitable solvents for etching acrylic foams are benzene, toluene, phenol, ethylene dichloride, ethyl acetate, dimethyl formamide, and acetic acid.

Examples of materials suitable for etching nylon include m-cresol, formic acid and phenol.

Thermoset polyesters can be etched by toluene or sodium hydroxide.

Polyethylene can be etched by carbon tetrachloride or chloroform.

Polypropylene and silicone foams can be etched by the application of glacial acetic acid or benzene.

Styrene-acrylonitrile, urea-formaldehyde and rubber can be etched by conventional gasolines and brake fluids.

An example of a preferred process for making a solar collector panel in accordance with the invention is as follows. A flat, rectangular, expanded bead polystyrene foam sheet two inches by twenty-three inches by eight feet, and having an average bead size between two and three millimeters in diameter, is treated with a lacquer thinner consisting of equal parts of acetone, ethyl acetate and toluene. The lacquer thinner is applied by spraying through multiple nozzles to produce seven longitudinally extending stripes, each being approximately three inches wide, and each extending the full eight foot length of the sheet from one edge to the opposite edge. The action of the solvent produces grooves approximately three inches wide and one inch deep. As soon as the average depth of the grooves reaches one inch, the face of the panel is air-dried by blowing air onto it at a temperature of approximately 100° F. Following drying, a conventional black paint is sprayed into the grooves in four different directions to insure full coverage. It is important that any coloring material used by substantially free of solvent which would attack the particular foam material to which it is applied. Accordingly the vehicle should be water or some other material which does not attack the particular foam material being used. Alternatively, barrier coatings can be used, in which case, the relationship between the solvent and the foam material is not critical. In the case of polystyrene foams, acrylic paints are preferred, since they increase the resistance of polystyrene to degradation by heat.

Following the application of coloring material, the panel is again air-dried. TEDLAR film between about 0.004 and 0.01 inch in thickness is secured to the grooved face of the foam sheet using silicone glue. A preferred type of silicone glue is G.E. Silicone Seal, available from General Electric Company.

Expanded bead polystyrene is a preferred material for use in making solar collector panels in accordance with this invention because the action of the solvent on the expanded beads releases entrapped blowing agent, causes the beads to collapse, and produces a groove, the surface of which is highly irregular, and therefore superior in the sense that it produces the results referred to previously most effectively. The evaporation of the solvent from the expanded bead polystyrene foam also deposits a relatively rigid and water-impervious film on the interior surfaces of the grooves, thus making the foam suitable for use in a water-type solar collector.

The preparation of collector panels from the other foam materials listed is carried out in a similar manner using the appropriate solvents.

As will be apparent from the foregoing, the process of the invention makes possible the rapid and efficient production of a simple yet highly efficient solar collector panel, usable with a liquid or gaseous heat transfer medium. The invention provides a manufacturing process which enables solar collector panels to be produced at a cost far below that of competitive panels.

Although specific details of the method of making the solar panel have been described, it will be apparent to those skilled in the art that various modifications can be made in the process. For example, the solvent stripes need not be straight, parallel stripes, but can be of various alternative configurations, including oblique stripes or intersecting stripes. The stripes can even be laid down in a pattern of intersecting longitudinal and transverse stripes so that the action of the solvent leaves an array of discrete pillars of foam material for supporting the transparent sheet. At least in the case of a solar panel designed for the use of air as a heat transfer fluid, a single groove, open to one end of a foam sheet can extend back and forth across the panel several times before it reaches the opening at the opposite edge of the foam sheet. The grooves need not extend from one edge of the foam sheet to another edge. For example, a single spiral groove can be etched on the face of a foam sheet and used to conduct air or another heat transfer fluid if suitable means are provided for conducting the fluid to and away from the panel. In another modification of the invention, the separate headers can be eliminated altogether by etching the fluid-conducting grooves so that they do not extend all the way to the edges of the foam sheet and providing transversely extending etched grooves which intersect the fluid-conducting grooves and serve as headers. Solvent etching readily lends itself to the formation of these and numerous alternative patterns of grooves.

The process can also be modified by applying the solvent to sheets having grooves already partially formed by molding, mechanical milling or melting. The face of the foam sheet to which the solvent is applied need not be flat, but can be of various alternative contours. For example, the face of the sheet can be cylindrical. Various other modifications which may occur to those skilled in the art after having read the foregoing description can be made without departing from the scope of the invention as defined in the following claims.

I claim:

1. The method of making a solar collector panel comprising the steps of providing a solidified sheet of foam material, forming on the face of said sheet a predetermined pattern of grooves sufficiently deep and wide to accommodate the turbulent flow of a supply of warm air for a portion of a building, in which the groove formation step is characterized by the application of a quantity of solvent to one face of the foam sheet in said predetermined pattern and the formation, by the action of the solvent, of irregular open pockets in the surfaces of said grooves, said open pockets being larger than the cells of the foam material, causing the surfaces of the grooves exposed by the action of the solvent to have a light-absorbing color, and securing a light-transmitting cover sheet to the remaining portions of said face, said cover sheet, when secured, conforming in shape substantially to the shape of the face prior to the groove formation step, whereby said grooves and said cover sheet together form channels for the turbulent flow of warm air.

2. The method according to claim 1 in which the foam material is expanded bead polystyrene.

3. The method according to claim 1 in which the step of causing the surfaces of the grooves to have a light-absorbing color is carried out by spraying coloring matter onto the interior surface of each groove through multiple nozzels disposed in different directions.

4. The method according to claim 1 in which the step of causing the surfaces of the grooves to have a light-absorbing coating is carried out by spraying a paint onto the interior of said grooves, said paint being substantially free of any solvent capable of attacking said foam material.

5. The method according to claim 1 in which the foam material is an expanded bead foam.

6. The method according to claim 1 including the step of forming a rigid film on the surfaces of the grooves by deposition of material dissolved from the foam when the solvent evaporates.

* * * * *